United States Patent Office 2,950,574
Patented Aug. 30, 1960

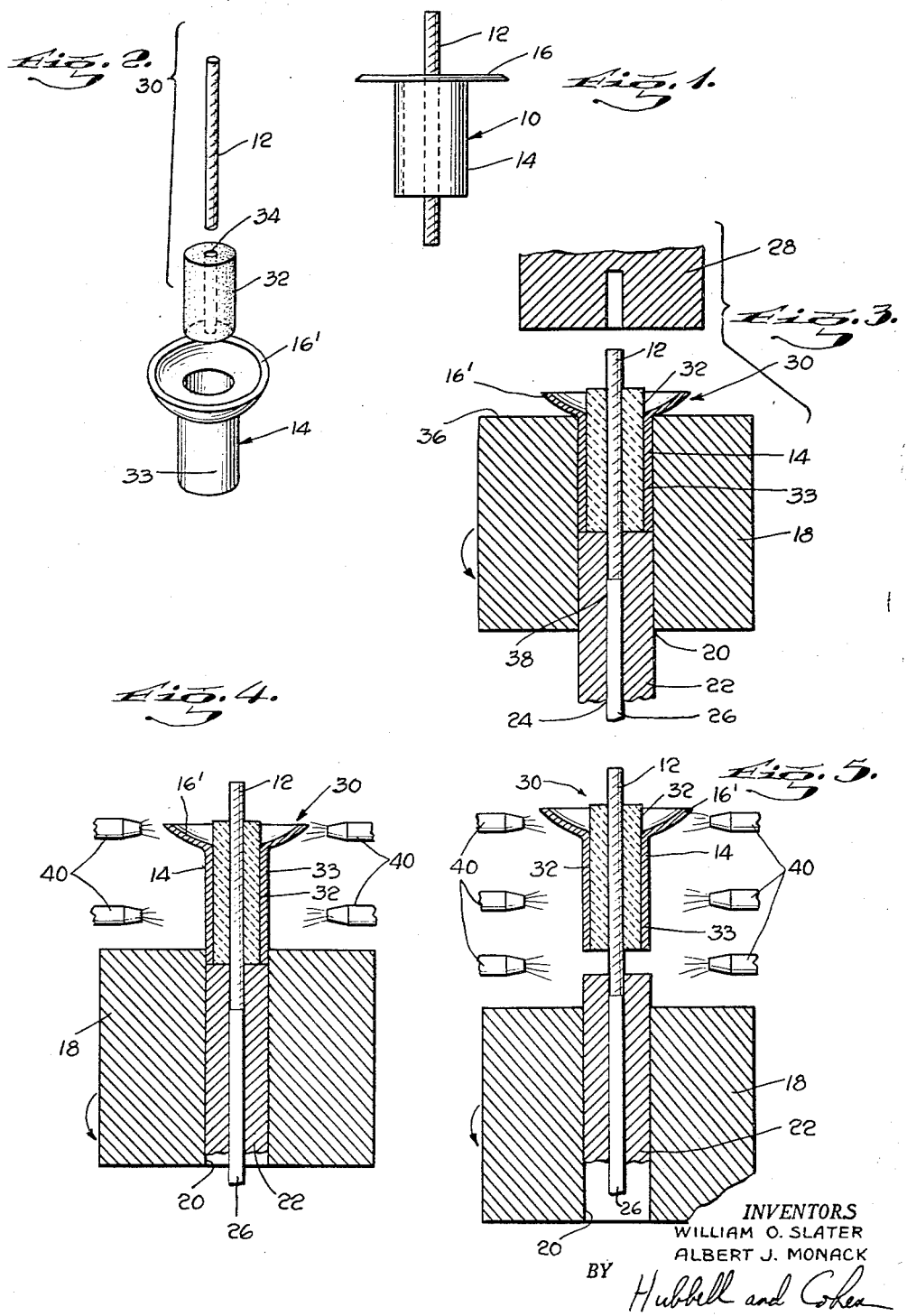

2,950,574

METHOD OF MAKING ELECTRODE STRUCTURES

William O. Slater, Totowa Borough, and Albert J. Monack, Rutherford, N.J., assignors to Mycalex Electronics Corporation, Clifton, N.J., a corporation of New York Filed June 6, 1956, Ser. No. 589,673

7 Claims. (Cl. 49—81)

This invention relates to a new and an improved method of manufacturing electrode structures and particularly to a new and improved method of manufacturing a hermetically sealed electrode.

The main object of the present invention is the provision of a new and improved method of manufacturing electrode structures.

Another object of the present invention is the provision of a new and improved method for manufacturing hermetically sealed electrode structures.

A still further object of the present invention is the provision of a new and improved method of manufacturing hermetically sealed electrode structures which are suitable for use over a wide range of temperatures and which are eminently adapted to effectively operate at high temperatures.

The above and other objects, characteristics and features of this invention will be more fully understood from the following description taken in connection with the accompanying illustrative drawing.

In the drawing:

Fig. 1 is a side elevational view of an electrode structure made in accordance with a method embodying the present invention;

Fig. 2 is an exploded perspective view of the components of the electrode structure shown in Fig. 1;

Fig. 3 is a sectional view illustrating an electrode assembly disposed within the die of a stem machine employed in our novel method;

Fig. 4 is a view similar to Fig. 3 illustrating one step of our novel method; and Fig. 5 is a view similar to Fig. 3 illustrating another step in our novel method.

Referring now to the drawing in detail, an electrode structure 10 made in accordance with our novel method is illustrated in Fig. 1. Such an electrode structure 10 comprises a longitudinally extending electrode 12 made of suitable conducting material such as steel alloy although other good conductors may be used. The electrode 12 extends through a cylinder of a vitrified vitreo-micaceous material and particularly a ceramoplastic, although glass-bonded mica may be employed. The vitreo-micaceous material is adhered to the electrode 12. Surrounding the vitreo-micaceous material is a ductile sleeve 14 having a flange 16 at the upper end thereof. Sleeve 14 is preferably made of copper although aluminum, stainless steel or other suitable material may be employed. An electrode structure as described above operates over a wide range of temperatures without breaking the hermetic seal between the electrode and the vitreo-micaceous material. This result flows from the fact that the coefficient of thermal expansion of the sleeve 14 is larger than that of the vitreo-micaceous material disposed therewithin, and the coefficient of expansion of the vitreo-micaceous material is larger than that of the electrode 12. Accordingly, as the temperature surrounding the electrode increases, the expansion of the several elements will operate to hold firm the electrode 12 within the vitreo-micaceous material whereby to prevent a breaking of the seal.

Problems have heretofore been encountered in manufacturing electrode structure 10. Particularly, it has been found difficult to effect a good seal between the vitreo-micaceous material and the sleeve and electrode due to, for instance, empty pockets in the vitreo-micaceous material weakening the seal. The present invention obviates the difficulties heretofore encountered. In practicing the present invention, a stem machine is employed to form the electrode structure 10. Such a stem machine comprises a die 18 having a cavity 20 therewithin. Slidably disposed within the cavity 20 of die 18 is a sleeve knockout 22 having a central channel or cavity 24. Slidably disposed within channel 24 is an electrode knockout 26. A ram 28 is provided in the stem machine and this ram is movable relative to said die towards and away from said die. Ram 28 and die 18 together with the latter's associated knockouts are rotatable in unison.

The component parts which make up an electrode assembly 30 are the electrode or conductor 12, the sleeve 14 and a bead 32 of vitreo-micaceous material. Prior to completion of the fabrication of electrode structure 10 sleeve 14 has a main body part here shown as a cylinder 33 and at one end of cylinder 33 a cup-shaped member 16' which, upon final compressing of the assembly as will be described in more detail hereinafter, is flattened to form the flange 16 shown in Fig. 1. For reasons which will become clearer hereinafter, bead 32 is longer than the main body portion 33 of sleeve 14. The bead of vitreo-micaceous material is made of compressed powdered glass and micaceous material. If glass-bonded mica is to be employed, the bead includes natural mica which is powdered and mechanically mixed and compressed with powdered glass. If ceramoplastic is to be employed, synthetic mica and preferably synthetic fluorphlogopite mica in powdered form is mechanically mixed with powdered glass and compressed into the form of a bead 32. The glasses used to form ceramoplastic and glass-bonded mica are usually borates and preferably lead borates, borosilicates or modifications thereof. For instance, the glass which we presently prefer using for a glass-bonded mica bead is composed essentially of 71.4% PbO and 28.6% $B_2O_3$. This glass may also be employed in making a ceramoplastic bead. However, if the higher temperature properties of synthetic fluorphlogopite mica are to be taken advantage of, we prefer using one of the glasses disclosed and claimed in U.S. patent applications, Serial Nos. 571,373 and 571,374 both owned by the assignee of the present invention. An example of one glass formulation suitable for use in manufacturing a high temperature ceramoplastic is composed essentially of 16.5% $B_2O_3$, 9.9% $SiO_2$, 70.4% PbO, and 3.2% $(K,Na)_2O$. The bead 32 as suggested hereinbefore, is made by mixing powdered micaceous material with finely ground glass frit. In addition, a mineralizer such as, for instance, cryolite may be added. The mechanical mixture of the micaceous material, frit and cryolite, may be within any of the following ranges of proportions:

| | Percent |
|---|---|
| Micaceous material | 30–50 |
| Frit | 50–70 |
| Cryolite | 0–4 |

The preferred mixture has the following proportions:

| | Percent |
|---|---|
| Micaceous material | 36.4 |
| Frit | 60.8 |
| Cryolite | 2.8 |

The mica, frit and cryolite are mixed in the above stated proportions and thereafter water or other suitable temporary binder is added up to approximately 10% by weight and after uniformity of mixture is achieved, the moist mixed powder is pressed into the form of bead 32 which as shown herein, is a cylinder having a central passage or cavity 34 adapted to receive the conductor 12.

To assemble the elements 12, 32 and 14 to form the electrode assembly 30, sleeve 14 is slidably positioned in the cavity 20 of open ended die 18 until the flange 16' engages the upper surface 36 of the die. Thereafter conductor 12 is disposed within the cavity 20 centrally of the sleeve 14 so that the bottom 38 of the conductor 12 engages the top of the electrode knockout 26. The electrode or conductor knockout is preferably positioned so as to dispose the electrode 12 symmetrically with respect to the longitudinal dimension of the main body portion 33 of the sleeve 14. Thereafter, vitreo-micaceous bead 32 is placed in the cavity 20 between the sleeve and the electrode so that the bottom of bead 32 is substantially even with the bottom of sleeve 14 and the top of the bead is disposed beyond the top of the main body portion 33 of sleeve 14 and preferably a little above the top of cup-shaped flange 16'. At this time ram 28 is spaced from die 18. The stem machine is started rotating. With the elements of the electrode assembly so disposed, knockouts 22 and 26 are moved upwardly so as to dispose a portion of sleeve 14 out of the cavity 20 of die 18. Suitable heating means such as gas jets 40 are actuated to apply heat to the upper part of the electrode assembly 30. By rotating the stem machine, heat is applied evenly along the periphery of the exposed portion of the electrode assembly. Accordingly, the upper portion of bead 32 will become sufficiently hot to cause the frit in the vitreo-micaceous bead to soften but not to be sufficiently fluid to lose its shape. In order to achieve this softening, if the simply formulated lead borate mentioned above is employed in the vitreo-micaceous material a temperature of about 1,100° F. must be reached. If the modified high temperature lead borate frit mentioned above is employed, the temperature must be raised to about 1,350° F.

With the upper portion of bead 32 softened by the heat from the jets 40, the vitreo-micaceous material will wet and adhere to the inner surface of sleeve 14 and the surface of electrode 12. Upon this wetting being achieved, the knockouts 22 and 26 may be moved downwardly whereby to permit the electrode assembly to move downwardly back to the position shown in Fig. 3. The heat at this time will be turned off whereby to permit the softened portion of the bead 32 to cool and reharden and thereupon make a temporary bond with the sleeve and electrode. The cooling may be effected with the assembly in the raised position shown in Fig. 4 but the cooling is accelerated by the high conductivity of the die 18 when the assembly is dropped back into the die.

After the assembly has cooled, knockouts 22 and 26 are moved upwardly to the position shown in Fig. 5 in which position all of the assembly 30 is disposed outside of the cavity 20 of die 18. Moreover, the electrode knockout 26 has been moved upwardly relative to the sleeve knockout 22 so as to move the sleeve out of engagement with the sleeve knockout, the entire assembly being supported at this time by the electrode knockout 26. It will be borne in mind that the assembly 30 could not be disposed in the position shown in Fig. 5 if a temporary bond between the vitreo-micaceous bead 32, the electrode 12 and the sleeve 14 had not heretofore been effected. With the electrode assembly disposed in the position shown in Fig. 5 and with the assembly being rotated as hereinbefore mentioned, jets 40 are again actuated to heat the electrode assembly in order to cause the vitreo-micaceous bead to soften throughout although, of course, the bead is not sufficiently fluid to run. Upon the softening temperature being reached and the vitreo-micaceous material softening whereby to wet and adhere to both the sleeve and electrode along the entire mutual length thereof, the knockouts 22 and 26 are moved down to permit the electrode assembly to move back into die 18 (i.e., to the position shown in Fig. 3), and ram 28 is moved toward die 18. As the ram engages the softened bead 32, the bead will tend to run out from under the ram, that is the bead will tend to move laterally of the direction of movement of the ram. However, with the flange 16' being cup-shaped, the movement of the bead material will be limited and, in fact, the material will be trapped between the flange 16' and the ram 28 as the ram moves downwardly. Accordingly, as the ram continues its movement toward die 18 the excess vitreo-micaceous material trapped between the ram and the flange is forced into the main body portion 33 of the sleeve 14 whereby to reduce the size of and tend to eliminate entirely any voids or pockets in the vitreo-micaceous material surrounded by the main body portion or cylinder 33 of sleeve 14. As the ram continues its downward movement it flattens the cup-shaped flange 16' so as to form a flat flange 16 as shown in Fig. 1. At this time any vitreo-micaceous material not forced in between electrode 12 and the main body portion of sleeve 14 is forced laterally outward from between the ram 28 and flange 16. Finally, the ram will subject the entire assembly to a longitudinal stress of the order of 10 to 20 pounds per square inch. This pressure is preferably applied for about 4 to 6 seconds during which time the gas jets are deactuated. This compression period will be sufficient to permit a cooling of the vitreo-micaceous material whereby to effect a firm leak-proof bond between it and the electrode and sleeve.

It is to be noted that without the provision of a cup-shaped flange 16' the portion of the vitreo-micaceous bead 32 which extends beyond the main body portion 33 of sleeve 14 would merely be forced out from between the ram and the die thereby not providing for any make-up for voids or pockets in the vitreo-micaceous bead. Moreover, without the provision of the excess portion of the vitreo-micaceous material forming the upper part of bead 32, there would be no material available during the compression of the assembly to fill in the voids and pockets. By the provision of these two elements, the method for manufacturing an electrode structure 10 may be satisfactorily worked.

As a modification of the present invention and as is now presently preferred, bead 32 instead of being compressed powdered micaceous material and glass which has not been bonded together other than by a temporary binder such as water, bead 32 can be in the form of injection molded vitreo-micaceous material such as ceramoplastic or glass-bonded mica. In manufacturing such a bead, a pill is formed in much the same manner as the water bound bead discussed above is formed. This pill is thereafter injection molded under heat and great pressure to form a vitreo-micaceous bead in which the micaceous material is bonded together by the vitreous material. This bead is, of course, cylindrical in configuration and is provided with a central longitudinally extending passage or cavity 34. To sum up, the major difference between the method now being described and the method being described above, is that in the presently described method the bead comprises micaceous material bonded with vitreous material whereas in the method described earlier in this application, the bead comprises powdered vitreous and micaceous material in a mechanical mixture and bonded together as by water. With this exception the method employed is exactly the same as that hereinbefore described. That is, the bead 32 is placed in the die and is operated upon with the other components of the electrode assembly in precisely the same manner as described earlier in this application.

While we have herein shown and described one form of the present invention, it will be understood that various changes and modifications may be made therein within the scope of the appended claims without departing from the spirit and scope of this invention.

Having now described our invention, what we claim as new and desire to secure by Letters Patent, is:

1. A method of making an electrode structure including a ductile metallic sleeve, a conductor disposed within said sleeve and vitreo-micaceous material therebetween, comprising the steps of positioning the conductor within a sleeve having a cup-shaped flange on one end thereof, disposing a bead of vitreo-micaceous material therebetween whereby to form an electrode assembly, heating said assembly adjacent to said flange until said vitreo-micaceous material adjacent said one end adheres to said sleeve and conductor, cooling said assembly, holding said assembly by said conductor and applying heat to said assembly along substantially the full length of said sleeve until said vitreo-micaceous bead softens, subjecting said assembly to pressure to compress said vitreo-micaceous material and to flatten said cup-shaped flange, and cooling said assembly.

2. A method of making an electrode structure including a ductile metallic sleeve, a conductor disposed within said sleeve and glass-bonded mica therebetween, comprising the steps of positioning the conductor within a sleeve having a cup-shaped flange at one end thereof, disposing a bead of glass-bonded mica therebetween whereby to form an electrode assembly, heating said assembly adjacent to said flange until the glass-bonded mica adjacent said flange softens so as to adhere to said sleeve and electrode, cooling said assembly, holding said assembly by said conductor and heating said assembly along substantially the full length of said sleeve until said glass-bonded mica softens, and subjecting said assembly to a pressure in the longitudinal direction of said assembly in the order of 10 to 20 pounds per square inch to compress said glass-bonded mica and to flatten said cup-shaped flange.

3. A method of making an electrode structure including a ductile metallic sleeve, a conductor disposed within said sleeve and ceramoplastic therebetween, comprising the steps of positioning the conductor within a sleeve having a cup-shaped flange at one end thereof, disposing a bead of ceramoplastic therebetween whereby to form an electrode assembly, heating said assembly adjacent said flange until the ceramoplastic adjacent said flange softens so as to adhere to said sleeve and conductor, cooling said assembly, holding said assembly by said conductor and heating said assembly along substantially the full length of said sleeve until said ceramoplastic softens, and subjecting said assembly to a pressure in the longitudinal direction of said assembly in the order of 10 to 20 pounds per square inch to compress said ceramoplastic and to flatten said cup-shaped flange.

4. A method of making an electrode structure including a ductile metallic sleeve, a conductor disposed within said sleeve and vitreo-micaceous material therebetween, comprising the steps of positioning the conductor within a sleeve having a cup-shaped flange at one end thereof, disposing a bead of vitreo-micaceous material of length longer than the length of the unflanged portion of said sleeve therebetween so that a portion of said bead is surrounded by said cup-shaped flange whereby to form an electrode assembly, heating said assembly adjacent said flange until said vitreo-micaceous material adjacent said one end adheres to said sleeve and conductor, cooling said assembly, holding said assembly by said conductor and applying heat to said assembly along substantially the full length of said sleeve until said vitreo-micaceous bead softens, subjecting said assembly to pressure to force a portion of said vitreo-micaceous material surrounded by said flange into said sleeve and to flatten said flange, and cooling said assembly.

5. A method of making an electrode structure including a ductile metallic sleeve, a conductor disposed within said sleeve and glass-bonded mica material therebetween, comprising the steps of positioning the conductor within a sleeve having a cup-shaped flange at one end thereof, disposing a bead of glass-bonded mica material of length longer than the length of the unflanged portion of said sleeve therebetween so that a portion of said bead is surrounded by said cup-shaped flange whereby to form an electrode assembly, heating said assembly adjacent said flange until said glass-bonded mica material adjacent said one end adheres to said sleeve and conductor, cooling said assembly, holding said assembly by said conductor applying heat to said assembly along substantially the full length of said sleeve until said glass-bonded mica bead softens, subjecting said assembly to pressure to force a portion of said glass bonded mica material surrounded by said flange into said sleeve and to flatten said flange, and cooling said assembly.

6. A method of making an electrode structure including a ductile metallic sleeve, a conductor disposed within said sleeve and ceramoplastic material therebetween, comprising the steps of positioning the conductor within a sleeve having a cup-shaped flange at one end thereof, disposing a bead of ceramoplastic material of length longer than the length of the unflanged portion of said sleeve therebetween so that a portion of said bead is surrounded by said cup-shaped flange whereby to form an electrode assembly, heating said assembly adjacent said flange until said ceramoplastic material adjacent said one end adheres to said sleeve and conductor, cooling said assembly, holding said assembly by said conductor and applying heat to said assembly along substantially the full length of said sleeve until said ceramoplastic bead softens, subjecting said assembly to pressure to force a portion of said ceramoplastic material surrounded by said flange into said sleeve and to flatten said flange, and cooling said assembly.

7. A method of making an electrode structure including a ductile metallic sleeve, a conductor disposed within said sleeve and vitreo-micaceous material therebetween, comprising the steps of positioning the conductor within a sleeve having a cup-shaped flange at one end thereof, disposing a bead of vitreo-micaceous material of length longer than the length of the unflanged portion of said sleeve therebetween so that a portion of said bead is surrounded by said cup-shaped flange whereby to form an electrode assembly, heating said assembly adjacent said flange until said vitreo-micaceous material adjacent said one end adheres to said sleeve and conductor, cooling said assembly, applying heat to said assembly along substantially the full length of said sleeve until said vitreo-micaceous bead softens, subjecting said assembly to pressure to force a portion of said vitreo-micaceous material surrounded by said flange into said sleeve, and to flatten said flange, and cooling said assembly.

References Cited in the file of this patent

UNITED STATES PATENTS

| | | |
|---|---|---|
| 732,812 | Anderson | July 7, 1903 |
| 1,562,533 | Weintraub | Nov. 24, 1925 |
| 1,848,312 | Bruzzone | Mar. 8, 1932 |
| 1,888,071 | Case | Nov. 15, 1932 |
| 1,974,298 | Case | Sept. 18, 1934 |
| 2,032,239 | Wedlock | Feb. 25, 1936 |
| 2,138,660 | Mann | Nov. 29, 1938 |
| 2,429,955 | Goldsmith | Oct. 28, 1947 |
| 2,603,915 | Lysak | July 22, 1952 |

FOREIGN PATENTS

| | | |
|---|---|---|
| 106,837 | Australia | Mar. 16, 1939 |